United States Patent
Srinivas et al.

(10) Patent No.: US 7,140,021 B2
(45) Date of Patent: Nov. 21, 2006

(54) DYNAMIC TCP PARTITIONING

(75) Inventors: NK Srinivas, Sammamish, WA (US); Sanjay N. Kaniyar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 771 days.

(21) Appl. No.: 10/243,480

(22) Filed: Sep. 13, 2002

(65) Prior Publication Data

US 2004/0054996 A1  Mar. 18, 2004

(51) Int. Cl.
  G06F 9/46 (2006.01)
  G06F 15/16 (2006.01)
(52) U.S. Cl. .................. 718/104; 709/230
(58) Field of Classification Search ............ 718/1, 718/100, 102, 104; 712/10, 13; 709/230
  See application file for complete search history.

(56) References Cited

U.S. PATENT DOCUMENTS

| | | | |
|---|---|---|---|
| 5,838,957 A * | 11/1998 | Rajaraman et al. ......... 713/502 |
| 6,163,855 A | 12/2000 | Shrivastava et al. |
| 6,662,219 B1 | 12/2003 | Nishanov et al. |
| 2002/0156824 A1* | 10/2002 | Armstrong et al. ......... 709/104 |
| 2003/0084175 A1* | 5/2003 | Kaniyar et al. ............. 709/230 |

OTHER PUBLICATIONS

U.S. Appl. No. 09/637,400, filed Aug. 11, 2000, Ramanathan et al.
U.S. Appl. No. 09/602,431, filed Jun. 23, 2000, Srinivas.
U.S. Appl. No. 09/999,132, filed Nov. 1, 2001, Kaniyar et al.
Dave MacDonald and Warren Barkely, Microsoft Windows 2000 TCP/IP ImplementationDetails, Feb. 2000.

* cited by examiner

*Primary Examiner*—Meng-Al T. An
*Assistant Examiner*—Camquy Truong
(74) *Attorney, Agent, or Firm*—Wolf, Greenfield & Sacks, P.C.

(57) ABSTRACT

A mapping between virtual processing units and physical processing units allows for an increase or decrease in the number of physical processing units installed in a computing device without disrupting the computing device's network communications. At startup, each of the virtual processing units can be allocated the necessary network communication management structures for supporting network communication. The networking subsystem can continue to use the virtual processing units as it would physical processing units, namely packets can be routed through the appropriate processing unit. However, because the networking subsystem is only aware of the virtual processing units, the mapping between the virtual processing units and the physical processing units can continually adjust for changes in the number of physical processing units installed, allowing the number of installed physical processing units to be modified without affecting the operation of the networking subsystem or ongoing network communications.

22 Claims, 6 Drawing Sheets

DYNAMIC TCP PARTITIONING

TECHNICAL FIELD

This invention relates generally to more efficient network communication processing and, more particularly, relates to dynamic scalability of network communication processing in computing devices having multiple processors.

BACKGROUND OF THE INVENTION

As the central processing units used by many computing devices achieve speeds approaching the practical maximum speed of processing technology, computing devices are increasingly being manufactured with multiple processing units to provide future speed increases. However, many systems have yet to be redesigned to take advantage of the multiple processing units and perform tasks in parallel, or divide tasks equally among the processing units. By redesigning individual systems, either in hardware or software, to accommodate multi-processor computing devices, further increases in speed, proportional to the increases experienced to date, can be achieved.

Due to the tremendous growth of the number of networked computing devices, connected to the both Internet and World Wide Web, and to smaller, more private networks, such as corporate or government Intranets, the ability of computing devices to efficiently handle network communications has become of paramount importance. Consequently, the efficient use of multiple processing units by network subsystems can provide a mechanism by which a computing device's ability to handle network communications can be easily and inexpensively enhanced. Lying at the core of the explosion of the popularity and usage of networks are simplified communication protocols such as the hypertext transfer protocol (HTTP) commonly used by the World Wide Web, and many Intranets. Such network protocols can often be layered on top of "lower level" protocols, that provide different features. Among the most common of these lower level protocols are the Transmission Control Protocol (TCP) and the Internet Protocol (IP).

The Internet Protocol provides the ability to break a message down into packets for transmission across packet-switching networks. Each packet can specify a destination, thereby allowing a single physical connection to be used for many different simultaneous communications. Each communication can be nothing more than a series of packets, and each packet, having a specified destination, can be sent independently of any other packet. In such a manner, a single physical connection can transmit an assortment of packets, each destined to a particular location, and thereby simultaneously support multiple communications.

The Transmission Control Protocol provides the ability of two hosts to establish a connection and exchange information. TCP can provide the necessary guidelines for ensuring that individual packets are properly delivered to the corrected destination, and that they are delivered in the proper order. By providing such delivery services, TCP and IP, collectively "TCP/IP", can provide a network communication foundation which can be used by other software and hardware, without the need to re-implement packetization, delivery, and routing functionality Each of these networking protocols require some amount of processing by the computing device, and specifically the processing units of the computing device, to perform their tasks. For example, upon establishment of a TCP/IP connection, the processing units of a communicating computing device can create a data structure known as a Transmission Control Block (TCB) that contains all of the connection information for the TCP/IP connection. A TCB can contain socket information that can uniquely identify the connection, such as the sockets at the two ends of computing devices communicating with one another, and a local connection name by which the user can reference the connection. Additional information stored in the TCB can be the security and precedence of the connection, pointers to the user's send and receive buffers, pointers to the retransmit queue and to the current segment and send and receive sequence variables. As a result of storing this and other data, the size of a typical TCB is on the order of 400 to 500 bytes of non-paged-pool memory.

The TCBs can be stored in a table, such as a hash table, that can be searched by the processing units, upon receipt of each packet, for the proper TCB. Because a TCP connection can progress through a series of states during its lifetime, such as LISTEN, SYN-SENT, SYN-RECEIVED, ESTABLISHED, FIN-WAIT-1, FIN-WAIT-2, CLOSE-WAIT, CLOSING, LAST-ACK, TIME-WAIT, additional tables can be created by the processing units to increase the efficiency of the overall system. For example, a TimeWait TCB table can be created, having TimeWait TCBs that occupy less memory space than a complete TCB, but can still provide the necessary information required during the TIME-WAIT state. Similarly, a SYN TCB table can be created, having SYN TCBs that occupy less memory space than a complete TCB, but can still provide the necessary information required during the SYN-SENT and SYN-RECEIVED states.

In addition to creating, maintaining and searching network communication variables, such as TCB tables, the processing units of the computing device can also be requested by the networking protocols to implement mechanisms such as timer wheels and delta queues to aid in network communication. Networking protocols implement a number of scheduled events that can require timers for proper operation. For example, TCP supports timers that can indicate the appropriate time for events such as retransmission, Delay-acknowledgement, Push, Silly-Window-Syndrome prevention, Finish-Wait-2-State, connection establishment and disconnection. Such timers can be maintained in a TCB, and a timer wheel can reduce the number of timers maintained in the TCB by implementing a circular timer buffer with a number of divisions, each corresponding to a fixed unit of time. A pointer to a TCB having an event that is to occur at a particular time can be entered into a corresponding division, allowing a single timer wheel to maintain many of the scheduled events of multiple TCBs. Similarly, a delta queue can maintain the scheduled events of a TCB, or multiple TCBs, by storing each scheduled event as a function of the time difference between it and the next most recent event. In such a manner, the only difference that needs to be continually updated though time is the difference between the current time and the most recently scheduled event in the delta queue.

In current computing devices having multiple processing units, the number of processing units is determined upon starting the computing device, and the networking protocols' requests are divided among those processing units. Therefore, for example, the various TCB tables, timer wheels, and delta queues required by TCP and IP can be created and allocated to each processing unit present when the computing device was started. However, if an additional processing unit is subsequently added to the computing device, in order for the networking protocols to take advantage of the additional processing unit, each of the TCB tables, timer wheels, and delta queues can be rehashed and otherwise redistributed among the all of the processing units currently available. Such a process can require so much time to complete that open connections may become disconnected. Because most multi-processor server computing devices are loath to disconnect client computing devices, either the networking protocols do not take advantage of the additional processing power and speed provided by the added processing unit, or the administrator of the computing device does not provide additional processing units while the server computing device is actively communicating with client computer devices.

SUMMARY OF THE INVENTION

By implementing a mapping between virtual processing units and physical processing units, the required network communication management structures can be allocated to a number of virtual processing units when the computing device is started, allowing the number of physical processing units to vary during the course of the operation of the computing device without the need to rehash or redistribute the allocation of network communication management structures. The mapping between virtual processing units and physical processing units can continually adjust for the number of physical processing units installed in the computing device, without alerting or adversely affecting the network communication protocols. For example, the various TCP structures described above, including the TCB tables, timer wheels and delta queues, can be allocated, one to a processor, to each of the virtual processing units. The receipt and transmission of network communication packets can proceed in a normal manner, whereby the underlying networking protocols determine the appropriate processor to which to route the received packet, and the higher-level networking software determines the appropriate process to which to route packets to be transmitted. However, the determination of the appropriate processors by the networking software and protocols only determines the appropriate virtual processing unit.

A mapping between the virtual processing units and the physical processing units installed in the computing device allows each of the packets routed through the virtual processing units to be seamlessly handled by the installed physical processing units. If the number of installed physical processing units changes, either due to the addition of more processing units or because some processing units have been removed, the operation of the networking system can continue uninterrupted because the mapping can instantaneously adjust and send the packets sent through different physical processing units. The mapping can be any of several known possibilities, including a round-robin mapping, block mapping, and the like. The selection of the mapping to use can be influenced by specific efficiency advantages inherent in specific mapping strategies. For example, a block mapping strategy can allow for more efficient searching of the networking structures allocated to the virtual processors being serviced by the single physical processor to which the block of virtual processors is mapped.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

The networking subsystem of a computing device can be conceptually thought of as a layered structure, with the physical electrical signals present on a communication medium comprising the lowermost layer, and the end-user applications transmitting information comprising the uppermost layer. Among the lower layers are networking protocols that translate between the simple networking communication signals, as received by networking hardware, and more complex messages sent by higher level networking software and end-user applications. Such networking protocols perform necessary functions such as packetization, routing, ordering, and retransmission, which can then be transparently used by higher level networking software. To perform these necessary functions, networking protocols rely on network communication management structures that are maintained and edited, at the protocol's request, by the processing units of the computing device. Additionally, the functions themselves are often performed by the processing units.

Consequently, in a computing device having multiple processing units, it can be advantageous to allow the networking protocols to utilize as many of the processing units as possible, to enable more efficient network communication. When networking protocols utilize multiple processing units, each of the processing units can be referenced individually, handling all of the communications for a particular connection and maintaining and editing its own networking structures as requested by the networking protocols for the connection being handled by that processing unit. While each specific networking protocol may require different network communication management structures, or different operations from the processing units, the vast majority of commonly used networking protocols rely on multiple processing units in an individual processor basis. As a result, while the detailed description of the present invention will reference specific protocols and their associated structures and operations, the selected protocols are meant to be exemplary only, and not a limitation of the present invention. As will be understood by those skilled in the art, the present invention is applicable to any networking protocols that can avail themselves of multiple processing devices.

Turning to the drawings, wherein like reference numerals refer to like elements, the invention is illustrated as being implemented in a suitable computing environment. Although not required, the invention will be described in the general context of computer-executable instructions, such as program modules, being executed by a computing device. Generally, program modules include routines, programs, objects, components, data structures, etc. that perform particular tasks or implement particular abstract data types. Moreover, those skilled in the art will appreciate that the invention may be practiced with other computer system configurations, including hand-held devices, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
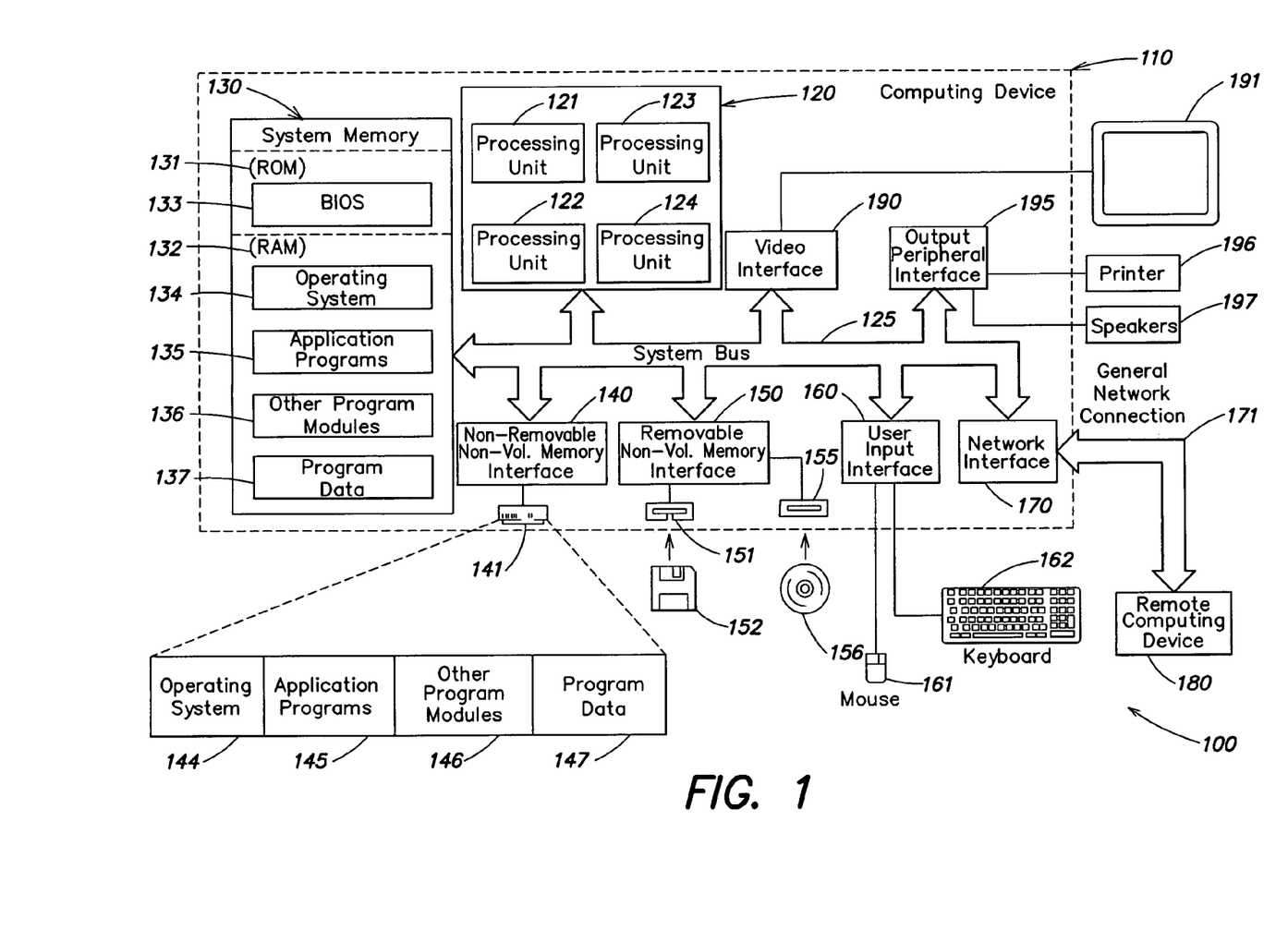
FIG. 1 is a block diagram generally illustrating an exemplary computer system on which the present invention resides.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device 110. Components of the computing device 110 may include, but are not limited to, a processing unit subsystem 120, comprising individual processing units 121–124, a system memory 130, and a system bus 125 that couples various system components including the system memory to the processing unit subsystem 120. The system bus 125 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computing device 110 typically includes a variety of computer readable media. Computer readable media can be any available media that can be accessed by computing device 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 110, such as during start-up, is typically stored in ROM 131. RAM 132 typically contains data and/or program modules that are immediately accessible to and/or presently being operated on by processing unit subsystem 120. By way of example, and not limitation, FIG. 1 illustrates operating system 134, application programs 135, other program modules 136, and program data 137.

The computing device 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 125 through a non-removable memory interface such as interface 140, and magnetic disk drive 151 and optical disk drive 155 are typically connected to the system bus 125 by a removable memory interface, such as interface 150.

The drives and their associated computer storage media discussed above and illustrated in FIG. 1, provide storage of computer readable instructions, data structures, program modules and other data for the computing device 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computing device 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit subsystem 120 through a user input interface 160 that is coupled to the system bus, but may be connected by other interface and bus structures, such as a parallel port, game port or a universal serial bus (USB). A monitor 191 or other type of display device is also connected to the system bus 125 via an interface, such as a video interface 190. In addition to the monitor, computers may also include other peripheral output devices such as speakers 197 and printer 196, which may be connected through a output peripheral interface 195.

The computing device 110 can operate in a networked environment using logical connections to one or more remote computers, such as a remote computing device 180. The remote computing device 180 may be another personal computer, a server, a router, a network PC, a peer device or other common network node, and typically includes many or all of the elements described above relative to the computing device 110. The logical connections depicted in FIG. 1 include a general network connection 171, that can be a local area network (LAN) a wide area network (WAN), or other type of network. Such networking environments are commonplace in offices, enterprise-wide computer networks, intranets and the Internet.

The computing device 110 can be connected to the general network connection 171 through a network interface or adapter 170, that can be connected to the system bus 125 for communication with the various subsystems of the computing device 110, described in detail above. In a networked environment, program modules depicted relative to the computing device 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing units of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

In accordance with the invention, a mapping is provided between a set of virtual processing units and physical processing units installed within a computing device. The networking subsystem of the computing device can operate using the virtual processing units, and the mapping can allow the number of physical processing units, that are actually performing the requested operations, to be dynamically changed without disruption to the networking subsystem. The number of virtual processing units can be either user-selected, or automatically selected by the computing device on startup. Additionally, the mapping between the virtual processing units and the physically installed processing units can be any one of a number of known mappings, including a round-robin, a block mapping, or the like. The selection of the type of mapping applied can be pre-selected, or it can be altered based on relevant hardware configurations of the computing device, such as a memory cache size or the speed of the system bus, that can be determined on startup.

Figure 2:
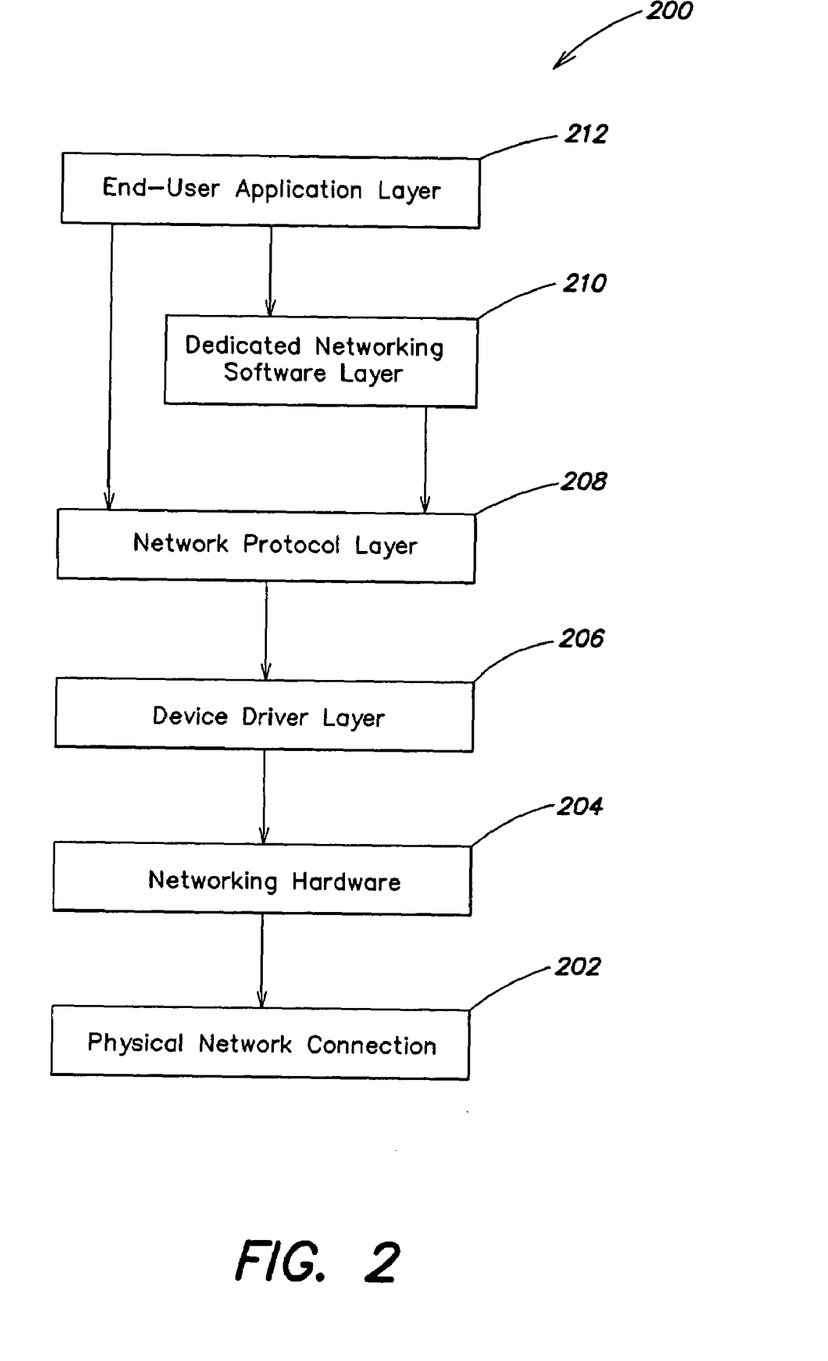
FIG. 2 is a block diagram generally illustrating an exemplary networking subsystem.

A general networking subsystem 200 is shown in FIG. 2, illustrated in a layered format to signify operational complexity. At the lowest layer can be the physical network connection 202, that can carry the electrical, optical, acoustical, or mechanical signals that comprise the network communication between computing devices, such as the computing device 110, described in detail above. Such a physical network connection 202 can correspond to the general network connection 171 described above.

Illustrated above the physical connection 202 can be networking hardware 204 resident at the computing device, that can detect, send, and receive the physical signals from the physical network connection 202. The networking hardware 204 can interface with the software of the computing device through a networking hardware driver layer 206. Such a driver layer can contain software for communicating with the networking hardware 204, including receiving information from, and sending information and instructions to the networking hardware. In one preferred embodiment, the driver layer 206 can comprise a single device-specific driver for communicating with the specific network hardware device with which the computing device is connected to the physical networking medium. In another preferred embodiment, the driver layer 206 can comprise multiple drivers, including a generic driver and a device specific mini-driver. A generic driver can provide commonly used interfaces to higher level software and generic instructions to a device specific mini-driver, which can translate the generic instructions into device-specific instructions for communicating with the specific network hardware device at layer 204. By using a generic driver and a mini-driver, commonly used instructions need not be rewritten for each device driver. Instead, individual manufacturers can simply create a mini-driver that translates generic instructions into device-specific instructions. The networking hardware layer 204 and the driver layer 206 can correspond to the network interface 170 described above.

Communicating with the driver layer 206 can be a network protocol layer 208, comprising various network protocols that can provide the necessary functionality to send and receive the complex messages sent by the dedicated networking software layer 210 and the end-user application layer 212. For example, the network protocol layer 208 can divide the messages sent by higher layers 210 and 212 into appropriately sized packets or elements for transmission by the networking hardware layer 204. Additionally, the network protocol layer 208 can determine, from the information received by the networking hardware layer 204 and delivered by the device driver layer 206, the appropriate destination for the information. The network protocol layer 208 can also determine the appropriate order for received packets, or whether a packet needs to be resent. By providing such network communication management services, the network protocol layer 208 can allow the dedicated networking software layer 210 and the end-user application layer 212 to send to it more complex messages for transmission across the network, without requiring each software application in layers 210 and 212 to contain computer code for performing these management services.

The network protocols at the network protocol layer 208 can rely on the processing unit subsystem 120 to perform the functions requested by the network protocols. Therefore, various timers required by the networking protocols for determining whether a packet needs to be resent, or whether a connection has become inactive, can be maintained by the processing unit subsystem 120 in memory storage, such as RAM 132. Additionally, the scheduling of events, such as a retransmission, or other communication, can be performed by the processing unit subsystem 120. Many network protocols also require the creation of network communication management structures for storing information regarding each network connection currently being serviced by the networking protocols. Such structures can contain information to uniquely reference the connection, buffer the most recently sent or received data, and determine the higher level software to which the data is to be directed.

In a computing device having multiple processing units, such as processing units 121–124 shown in the processing unit subsystem 120 of computing device 110, the network protocols of layer 208 can use each processing unit on an individual basis. Thus, when network communication information is received by the networking hardware 204 and indicated, by the device driver layer 206, to the network protocol layer 208, the network protocols can determine which processing unit, of the multiple processing units available, is the appropriate one to use to perform the necessary processing of the received information. For example, if network communication with a particular computing device has been handled by a particular processing unit, the network protocols can determine if the received information corresponds to that connection and, if it does, can request the particular processing unit to be the processing unit used to perform the necessary functions for the received information. Therefore, each processing unit can maintain its own copy of the necessary network communication maintenance structures, such as tables or caches for storing the relevant network communication information, including the unique connection reference, the send and receive buffers, and any scheduled events.

To facilitate the removal or addition of a physical processing unit into the computing device 110 during its operation, and while network communication connections are open, the present invention contemplates the use of a mapping between a number of virtual processing units and the physical processing units currently installed in the computing device. Each virtual processing unit can be used by the network protocols in an identical manner to a physical processing unit, with each virtual processing unit having its own copy of the network communication maintenance structures, and each virtual processing unit being exclusively used for a particular connection. As will be realized by those skilled in the art, because each network communication maintenance structure can require memory storage, and because other inefficiencies can result from too many virtual processing units, it can be desirable to limit the number of virtual processing units to a number not larger than the largest number of physical processing units that can be installed in a given computing device.

The number of virtual processing units can be user-selected, through a dialog box or a prompt presented to the user during the startup sequence of the computing device. Alternatively, the user can access a utility or other software program to select the number of virtual processing units. At such a time, the user can be warned of the inefficiencies that can result from a selection of too many virtual processing units.

Alternatively, the number of virtual processing units can be automatically selected by the appropriate operating system software, such as the operating system 134, the BIOS 133, or other program modules 136. In one exemplary embodiment, the number of virtual processing units can be set to an industry standard for commonly used computing devices. For example, current computing devices rarely have support for more than 64 processing units. Therefore, setting the number of virtual processing units to 64 can allow the benefits of the present invention to be provided to the vast majority of computing devices, without the need for additional software to enable variation in the number of virtual processors. In another exemplary embodiment, the number of virtual processing units can be determined based on parameters detected during the startup sequence of the computing device 110. For example, the BIOS 133, or operating system 134 can automatically detect, upon startup, the maximum number of processing units that can be installed, such as by detecting processor slots in a motherboard of the particular computing device. The number of virtual processing units can, therefore, be automatically set to this detected maximum, ensuring an efficient selection.

Once the number of virtual processing units has been selected, the virtual processing units can be registered with the operating system 134, or with only the network protocols in the network protocol layer 208, in such a manner that the network protocols can direct processing requests to the virtual processing units rather than the installed physical processing units. The network protocols can then send requests to as many virtual processing units as needed, in a manner identical to that in which the network protocols would have sent requests to the physical processing units. As network communication connections are established by the computing device 110, one or more of the virtual processors will be enlisted by the network protocols, and each virtual processor can then create and maintain the network communication maintenance structures described generally above.

Figure 3A:
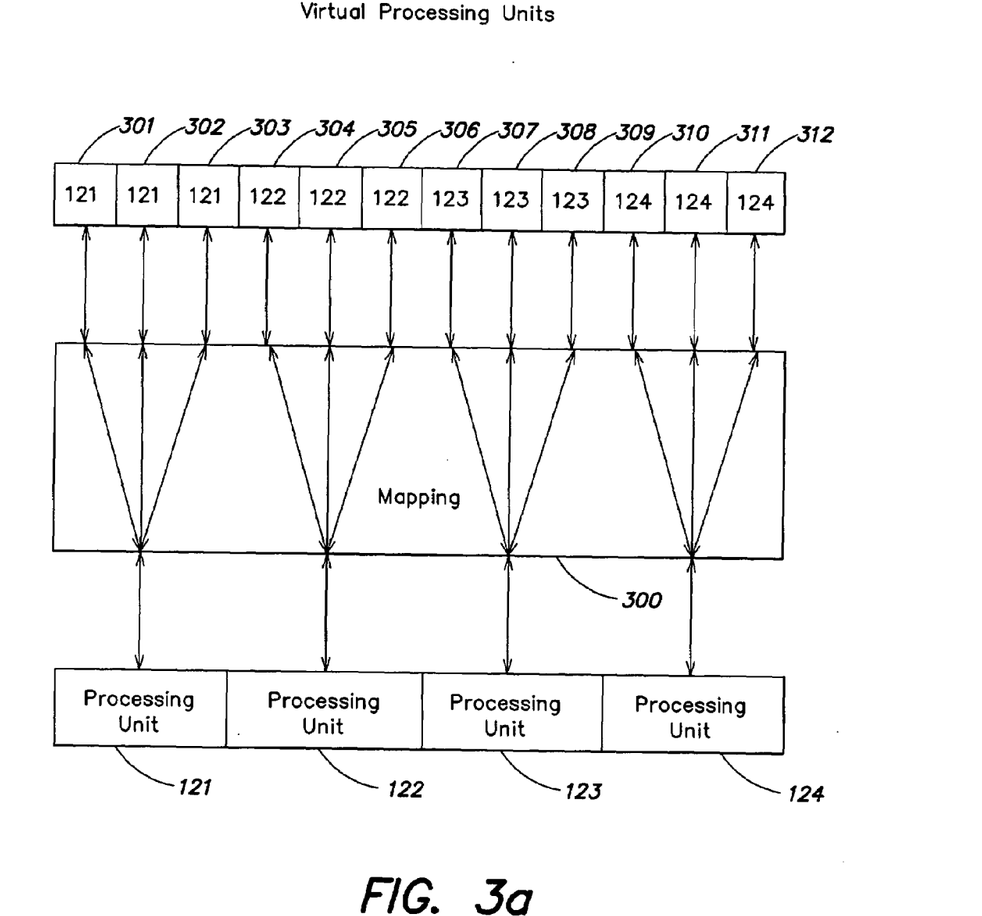
FIGS. 3a and 3b are a block diagram generally illustrating a mapping contemplated by the present invention.

Turning to FIG. 3a, one mapping between virtual processing units 301–312 and installed physical processing units 121–124 contemplated by the present invention is shown. As can be seen, the virtual processing units are mapped to physical processing units in a block configuration, with consecutive virtual processing units often being mapped to the same physical processing unit. Therefore, the mapping 300 can receive a request by the network protocols to virtual processor 301, and it can route that request to the installed physical processing unit 121 to perform the requested operations. A resulting response from the processing unit 121 can be similarly routed to the network protocols to appear to come from virtual processor 301. In such a manner, the network protocols can continue to utilize the virtual processing units 301–312, as they would physical processing units, while the mapping 300 can accommodate for changes in the installed physical processing units 121–124.

Figure 3B:
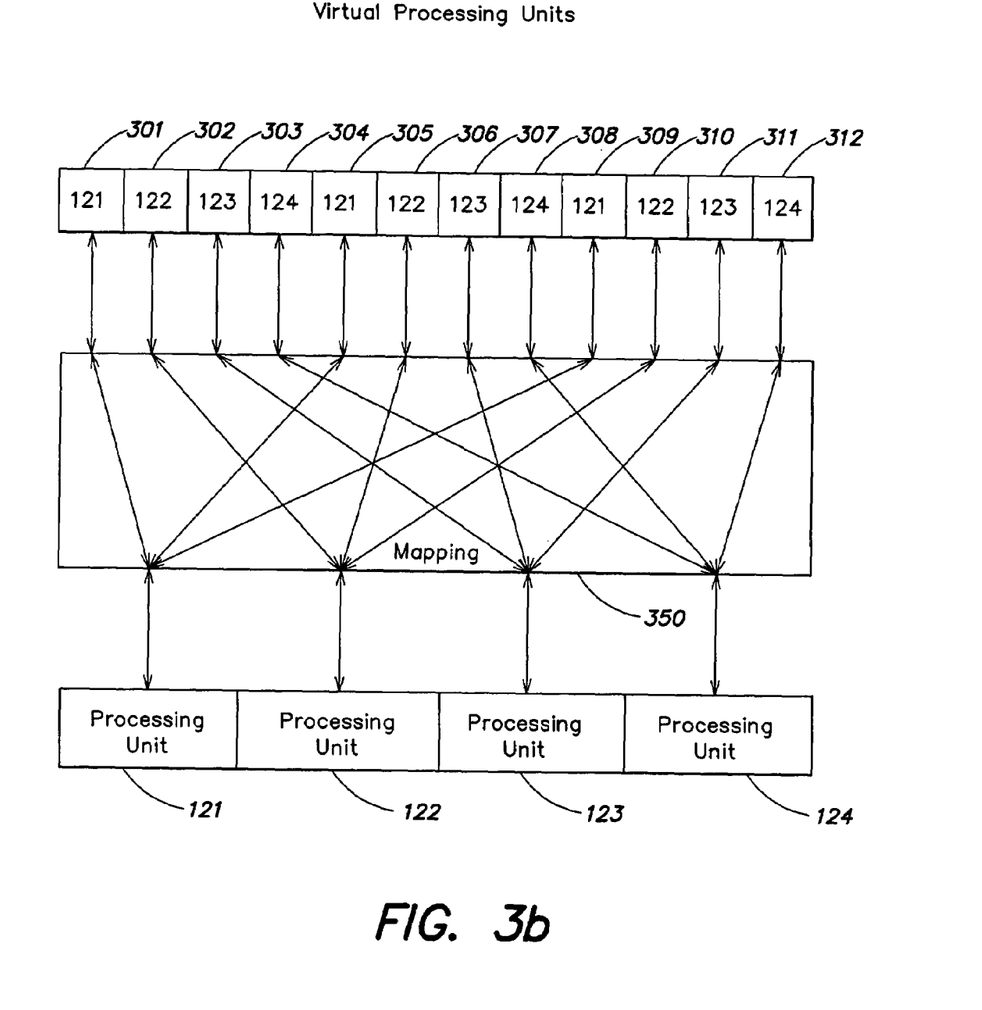

FIG. 3b illustrates another mapping 350 contemplated by the present invention. As shown, each contiguous virtual processing unit is mapped to a different physically installed processing unit. Such a mapping may provide for more equal distribution of network protocol processing requests among the physically installed processing units, because the networking protocols may simply request that the next sequential virtual processing unit perform operations to the next network communication connection to be created. In such a case, the first network communication connection can be assigned to virtual processing unit 301 and the next network communication connection can be assigned to virtual processing unit 302. Using the mapping 300 shown in FIG. 3a, the computing device 110 would end up with a single physical processing unit 121 performing all of the network operations, because virtual processing units 301 and 302 would both map to the same physical processing unit 121. The remaining installed processing units 122–124 would remain unused, negating the benefit of having multiple processing units. However, using the mapping 350, shown in FIG. 3b, physical processing units 121 and 122 would equally share the operational burden of the two network communication connections.

Figure 4:
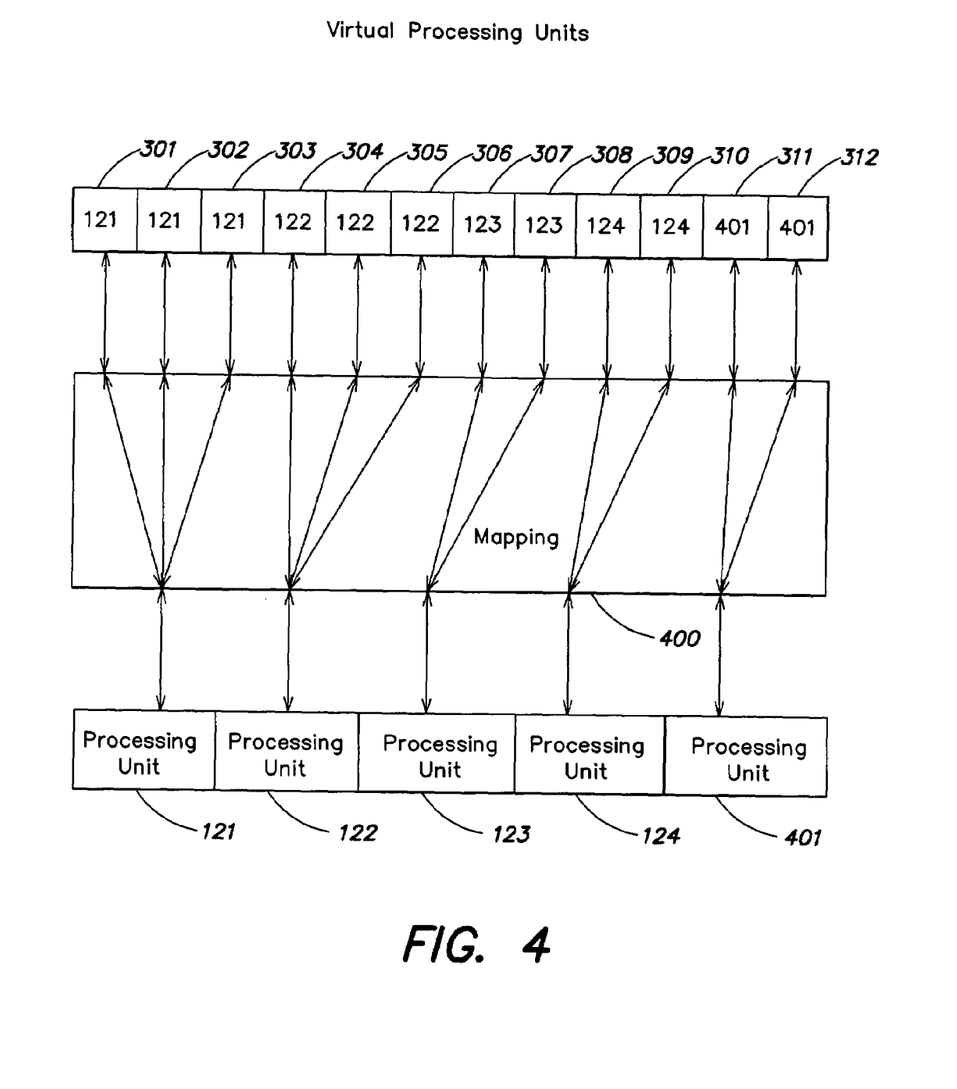
FIG. 4 is a block diagram generally illustrating a mapping contemplated by the present invention.

Because the network protocols make use only of the virtual processing units 301–312, and divide the open connections among those units, the mapping contemplated by the present invention can allow for modifications to the number of physical processing units installed in the computing device 110 without the need to rehash or redistribute any of the network communication maintenance structures established by the network protocols with the virtual processing units 301–312. For example, as shown in FIG. 4, the mapping 300 from FIG. 3a is reconfigured to accommodate the addition of another installed physical processing unit 401. The addition of the physical processing unit 401 could be detected through a plug-and-play event, or other automatic notification provided by hardware maintenance services resident in the operating system 134 or the BIOS 133. Alternatively, the addition of the physical processing unit 401 could be detected through a mechanism which continually monitors the number of installed physical processing units.

As a result of the addition of physical processing unit 401, the mapping 400 need only map two virtual processing units to each of the physical processing units 123, 124, and 401, while maintaining the three virtual processing units being supported by physical processing units 121 and 122. Consequently, the performance of the requests sent by the network protocols to virtual processing units 307–312 can be increased since each physical processing unit 123, 124 and 401 is now only performing the functions for two virtual processing units, rather than three.

Each of the virtual processing units used by the network protocols can rely on its own set of network communication maintenance structures, in a manner identical to that previously used with multiple physical processing units. As a result, the re-mapping of a virtual processing unit from one physical processor to another need not require rehashing or redistribution because the newly mapped physical processing unit can simply use the same structures as the previously mapped physical processing unit. Thus, for example, as shown in FIG. 4, virtual processing unit 309 was re-mapped to physical processing unit 124 from physical processing unit 123. However, because virtual processing unit 309 received requests from the network protocols regarding only those connections for which virtual processing unit 309 was responsible, and maintained its own copies of the required network communication maintenance structures, the request from the network protocols can be executed by the physical processing unit 124 just as they were by the physical processing unit 123. Consequently, the processing requested by the network protocols can take advantage of the added physical processing unit 401 without disrupting the currently active network communication connections.

Figure 5:
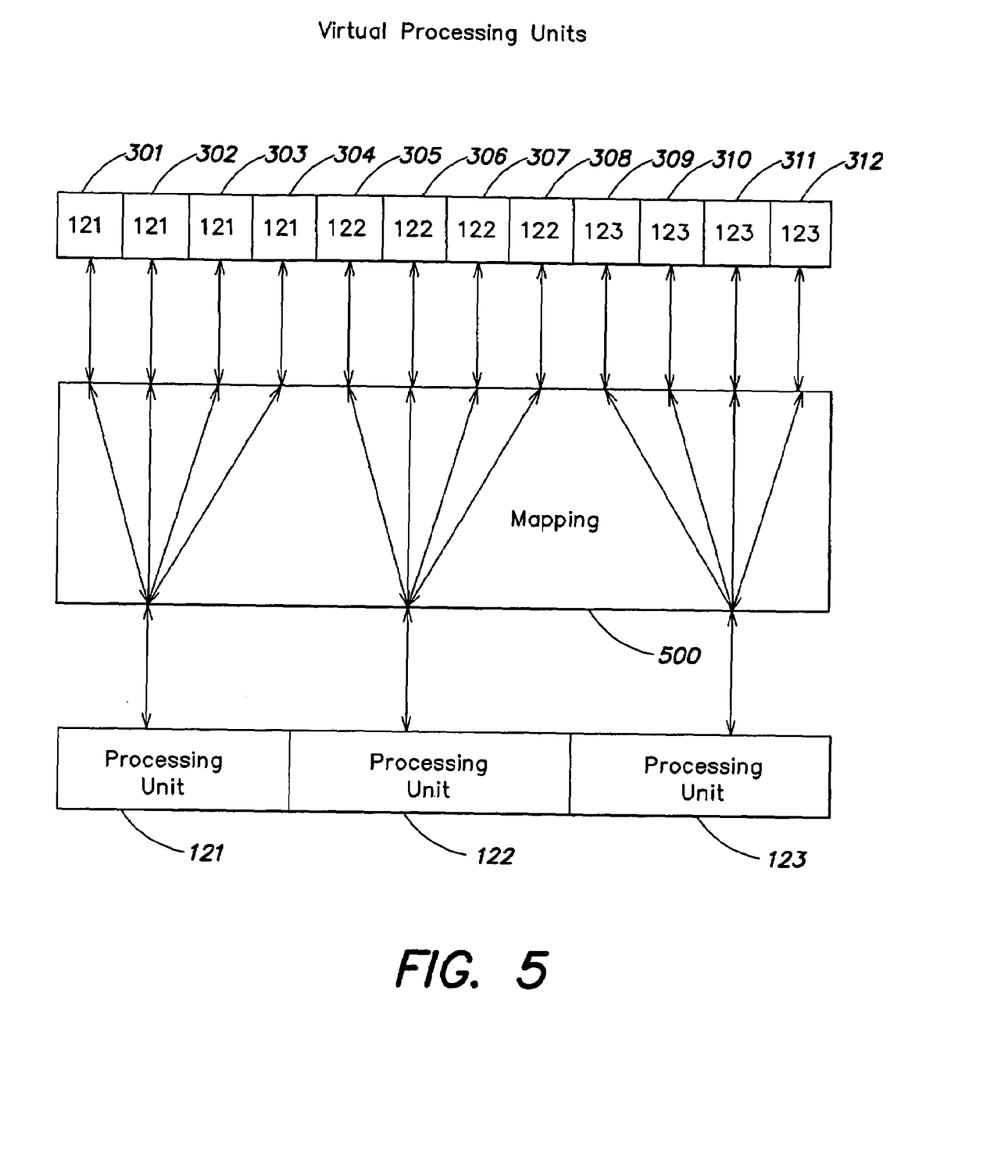
FIG. 5 is a block diagram generally illustrating a mapping contemplated by the present invention.

In a similar manner, the mapping contemplated by the present invention can accommodate the removal of a physical processing unit. Turning to FIG. 5, a mapping 500 is shown, wherein the virtual processing units 301–312 are mapped to only three physical processing units 121–123. In the same manner as described above, because each of the virtual processing units maintains all of the necessary structures to perform the functions requested by the network protocols, the particular physical processing unit to which the virtual processing unit is mapped can change without affecting the operation of the network protocols. Thus, for example, as shown in FIG. 5, virtual processing unit 304 can have been re-mapped from physical processing unit 122 to physical processing unit 121. Because each of the physical processing units now has at least four virtual processing units mapped to it, the operation of the functions requested by the network protocols may be slower, but the overall system was able to seamlessly adjust to the removal of a physical processing unit from the computing device.

While the present invention is applicable to any sort of network protocol, as the above detailed description illustrates, a detailed description of the operation of the present invention with a commonly used network protocol is provided as an example only, and not as a limitation on the scope of the present invention. With the explosive growth of the Internet and the World Wide Web, the Transmission Control Protocol ("TCP") and the Internet Protocol ("IP"), collectively "TCP/IP" have become among the most commonly used networking protocols in local and wide area networks throughout the world. As explained above, necessary maintenance information about a particular network connection using the TCP/IP protocols can be stored in a Transmission Control Block ("TCB"). For example, among the variables stored in the TCB are the local and remote socket numbers, the security and precedence of the connection, pointers to the user's send and receive buffers, pointers to the retransmit queue and to the current segment. In addition, several variables relating to the send and receive sequence numbers are stored in the TCB. These send sequence variables include SND.UNA (send unacknowledged), SND.NXT (send next), SND.WND (send window), SND.UP (send urgent pointer), SND.WL1 (segment sequence number used for last window update), SND.WL2 (segment acknowledgment number used for last window update), and ISS (initial send sequence number). The receive sequence variables include RCV.NXT (receive next), RCV.WND (receive window), RCV.UP (receive urgent pointer), and IRS (initial receive sequence number).

A TCP/IP connection can be initiated by the receipt of an arriving segment containing a SYN and a waiting TCB entry each created by a user OPEN command. A connection progresses through a series of states during its lifetime. The states are: LISTEN, SYN-SENT, SYN-RECEIVED, ESTABLISHED, FIN-WAIT-1, FIN-WAIT-2, CLOSE-WAIT, CLOSING, LAST-ACK, TIME-WAIT, and the fictional state CLOSED. CLOSED is fictional because it represents the state when there is no TCB, and therefore, no connection. The TIME-WAIT state represents waiting for enough time to pass to be sure the remote TCP received the acknowledgment of its connection termination request. That is, when a connection closes in the graceful-close mode, the corresponding TCB needs to be kept in this Time-Wait state to avoid late-routed packets from establishing new connections on the same connection (Source IP, Source Port, Destination IP, Destination Port).

Once the connection is closed there is no longer any reason to keep all of the information of the TCB since no further servicing is necessary for the connection. The TCB information during a time_wait state is used to prevent stale data segments from a previous incarnation of the connection to be mistaken for a new connection, if a new connection is allowed for the same address pairs (source, destination address, and port pairs). This purpose can be accomplished without maintaining the full TCB, thus freeing up system resources that may then be used to service additional connections. To accomplish this, a copy of selected information from the TCB can be made as the connection is switched from active to time-wait state to form a time-wait TCB (TWTCB). Once the selected information is copied form the TCB to the TWTCB, the TCB can be discarded.

In one embodiment, the reduction of the information for the TWTCB 204 used to uniquely identify the connection results in the usage of only approximately 88 bytes of data (96 bytes total including 8 bytes for the structure itself). Further reductions to only a single cache line (32 bytes) for the TWTCB are also achievable. Some of the information contained in the TCB that can be eliminated in the TWTCB can be the connection state information, send and receive queue information, the routing disconnect indication, and the routing information for the connection.

Similar memory storage savings can be realized during the establishment of a TCP/IP connection. One computing device establishes a TCP connection with another computing device by transmitting a connect request (TCP SYN). This TCP SYN causes the network protocol, TCP, to create a TCP control block to service the connection, and pass the connect request to the socket layer. The socket layer can then indicate, to the TCP/IP layer, the acceptance of this connect request, causing the TCP/IP layer to cache route information about the connection and client, and transmits an acknowledgment (TCP SYN+Ack). The connection can be completed when the other computing device acknowledges this acknowledgement. This three-way handshake establishes a TCP connection between two computing devices.

To guard against malicious network communication attacks, the involvement of any layer other than the TCP/IP layer can be minimized by not informing any other layer until the three-way handshake is completed and the connection is established. Additionally, the caching of route information can be delayed until the three-way handshake is completed. Finally, the computing device need only allocate a small (approximately ¼ size) TCB to handle the SYN state until the three-way handshake is completed. Previously, the TCB was allocated for each connection at the time of the connect request. The size of the TCB was that required to fully service the connection, even though the connection had not yet been fully acknowledged. The smaller TCB, called a "SYN TCB" is sized to hold only that amount of information that is necessary to establish the connection. For example, the SYN TCB can contain the remote computing device's IP address and port number, preferably tagged with local IP address and port number, and the maximum transmit unit (MTU) of the proposed connection. Once the connection is established, the rest of the TCB can be allocated.

In a computing device with multiple processing units, each processing unit can be used by TCP/IP to perform tasks to handle the TCP/IP connections of the computing device. Each processing unit can, therefore, create and maintain its own TCB table, as well as a TWTCB table and a SYN TCB table, for the TWTCBs and the SYN TCBs described in detail above. For example, turning to FIG. 1, if a request for a connection is received through the general network connection 171, a SYN TCB can be created for use by processing unit 121 in performing the necessary functions for responding to the request. If a connection is subsequently established, the processing unit 121 can create a TCB and store it in a TCB table. Subsequent packets received by the network interface 170 can be checked by TCP/IP, and if they are packets corresponding to the established connection, processing unit 121 can be requested to perform the necessary functions. Similarly, once the connection is closed, a TWTCB can be created by processing unit 121 and maintained in a TWTCB table.

As will be understood by those skilled in the art, a multi-processing unit computing device, such as computing device 110 illustrated in FIG. 1, can support a large number of TCP/IP connections. Therefore, the first connection can use processing unit 121, the second connection can use processing unit 122, and so forth, spreading the connections as equally as possible among the processing units. Consequently, each processing unit 121–124 can maintain the above described TCB tables, containing TCBs for each of the connections.

The present invention contemplates that, rather than requesting the performance of a function from the physical processing units 121–124 directly, TCP/IP would use virtual processing units 301–312 in an identical manner. Therefore, each of the virtual processing units 301–312 could have, as described above, a SYN TCB table, a TCB table, and a TWTCB table. Similarly, rather than spreading the connections received by the network interface 170 among four processing units, TCP/IP can spread them among the twelve virtual processing units 301–312. The mapping contemplated by the present invention, such as mapping 300, can then determine the physical installed processing unit, such as processing units 121–124, that will actually access the various TCB tables assigned to the corresponding virtual processing unit, and perform the functions requested by TCP/IP. Thus, for example, as shown in FIG. 3a, a received packet requiring the use of virtual processing unit 301, and its associated TCB tables, can be directed for processing to the physical processing unit 121. Similarly, a received packet requiring the use of virtual processing unit 302, perceived by TCP/IP to be a different processor, can also be directed to the physical processing unit 121. One advantage of the block mapping shown in FIG. 3a, is that the various TCB tables for contiguous virtual processing units, such as the TCB tables for virtual processing units 301–303, can all be loaded into a processing unit cache for faster access, enabling the physical processing unit 121 to search through all of the TCB tables for all of the virtual processing units currently mapped to it.

In addition to the various TCB tables described above, additional communication maintenance structures can also be used by TCP/IP on a per-processing unit basis. For example, TCP supports a number of scheduled event timers for each connection. These timers include, among others: (1) retransmission, (2) Delay-Acknowledgement, (3) Push, (4) Silly-Window-Syndrome prevention, (5) Finish-Wait- 2 -State, and (6) Connection establishment/disconnection. The TCP timers can be maintained in a transmission control block (TCB). During the lifetime of a TCP connection, a number of events are scheduled on the connection to occur after a specified period of time. For example, the protocol may not indicate "data received" from the network immediately to a user. Instead it waits for a period of time (e.g., 500 msec.) to ensure that there is no more data to be received from the network. The protocol schedules an "indicate data" action on the connection to fire after the 500 msec. wait period expires. In another example, if data is sent on a connection, a timer corresponding to a "retransmit" action is set and the protocol waits for a period of time for acknowledgement from the intended recipient. If such an acknowledgement is not received within the wait period, then the timer fires, and the data is retransmitted. The timer is cleared if the acknowledgement is received prior to expiration of the wait period. To schedule such actions, the protocol sets an appropriate timer within the TCB. A timer management framework accesses the timers, notes when one has expired, and invokes a proper handler routine.

One mechanism for providing an efficient timer management framework includes a circular timer buffer, also referred to as a timer wheel, that can comprise a set of queues corresponding to distinct time-slices (or ticks). The traversal period of the timer wheel can be extended or reduced by, for example, modifying the number of queues and/or the time-slice associated with each queue. Placing a TCB reference upon a particular queue can be determined by performing a modulo operation upon an earliest relevant scheduled action for the connection corresponding to the TCB. However, some earliest scheduled actions represented in a TCB occur beyond the full traversal period of the timer wheel. Therefore, not all the TCBs in a currently accessed partition queue include scheduled actions having expired delays. To ensure that a scheduled action is not processed too early, when a TCB is removed from a partition queue for processing, the timer management framework compares the current TCP tick value to a time for a scheduled action stored within a TCB. If the scheduled action time has not yet been reached, then the TCB is re-queued.

Another mechanism for providing an efficient timer management framework is a delta queue, which can store a series of events in time order, with the events nearer to the front of the queue occurring sooner. Each event can be stored, not as an absolute time at which the event is to occur, but as a relative time; relative to the time at which the immediately preceding event is to occur. The very first entry in the queue can, therefore, indicate the time difference between the time at which it is supposed to occur, and the current time. In such a manner, the only entry in the queue that requires updating as time passes is the first entry, since all of the other entries are referenced by relative times that do not change. When the time for the first entry's event occurs, that entry can be removed from the queue, and the immediately following entry can become the first entry. As will be understood by those skilled in the art, because the immediately following entry was stored by reference to the first entry's time, when the first entry is removed, the immediately following entry automatically indicates the time difference between the current time and the time at which its event is to occur, since the current time is the time at which the first entry's event occurs, and was the time relative to which the immediately following entry was referenced. Such a delta queue can be used to reference TCBs that have scheduled actions, as can the timer wheel described above.

Therefore, the present invention contemplates that each of the virtual processing units 301–312 may also create and maintain their own copies of timer wheels and delta queues with which to schedule TCP/IP events, as described above. Again, as before, such structures would, in fact, be maintained by whichever installed physical processing unit the virtual processing unit was mapped to. However, such indirection would not be evident to the TCP/IP protocols, as they would be using the individual virtual processors 301–312 as if they were physically installed in the computing device 110.

As can be seen, the present invention contemplates the use of a mapping between a set of virtual processing units that can be used in a normal manner by network protocols, and a set of physically installed processing units, that can be modified during the operation of a host computing device without disrupting the network connections and communications managed by the network protocols. Such a mapping can be contained in any number of memory structures. In one preferred embodiment, such a mapping can be contained in a table to provide easy access to the software routines redirecting the requests of the network protocols from the virtual processing units to the installed processing units. Such a mapping table could contain as many entries as the number of virtual processing units, selected as described in detail above. Each entry in the table could contain a pointer or other reference to the installed physical processing unit to which the virtual processing unit is mapped. Therefore, the mapping illustrated in FIG. 3*a* could be contained in a mapping table having twelve entries, with the first three entries containing a reference to the physically installed processing unit 121, the next three entries containing a reference to the physically installed processing unit 122, and so forth. Similarly, the mapping illustrated in FIG. 3*b* could be contained in a mapping table having twelve entries, with the first entry containing a reference to the physically installed processing unit 121, the second entry containing a reference to the physically installed processing unit 122, and so forth. The addition or removal of a physical processing unit simply requires that the entries in the table be appropriately modified to account for the change and reflect the new mappings, such as those described in detail above.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof

We claim:

1. A method for operating a computer connected to a network, the computer having a network protocol that processes information transmitted over the network trough a plurality of connections, the method comprising:
   a) mapping a set of virtual processing units to a set of physically installed processing units;
   b) creating a plurality of network communication management structures, each network communication management structure storing information about a connection of the plurality of connections and having at least one field for storing data accessed by any processing unit in the set of physically-installed processing units when processing a network protocol request relating to the connection; and c) processing a network protocol request from the network protocol, the network protocol request being associated with a connection of the plurality of connections, the processing comprising:
i) accessing a virtual processing unit of the set of virtual processing units;
ii) determining a physically installed processing unit of the set of physically installed processing units to which the virtual processing unit is mapped; and
iii) directing the network protocol request to the determined physically installed processing unit, wherein the determined physically installed processing unit accesses a network communication management structure associated with the connection.

2. The method of claim 1, wherein determining the physically installed processing unit comprises referencing a mapping table, the mapping table relating the set of virtual processing units to the set of physically installed processing units.

3. The method of claim 2 further comprising: detecting a modification in the set of physically installed processing units; and updating the mapping table to relate the set of virtual processing units to the modified set of physically installed processing units.

4. The method of claim 1, wherein each of the network communication management structures is associated with one of the virtual processing units from the set of virtual processing units.

5. The method of claim 1 further comprising selecting a size of the set of virtual processing units based on a detected hardware configuration.

6. The method of claim 1, further comprising:
altering the mapping without causing a failure of any of the plurality of connections.

7. The method of claim 1, wherein:
directing the network protocol request to the determined physically installed processing unit comprises directing the network protocol request to a first physically installed processing unit at a first time; and
the method further comprises, at a second time, processing a second network protocol request associated with the connection, the processing comprising directing the second network protocol request to a second physically installed processing unit, wherein the second physically installed processing unit accesses the network communication network management structure associated with the connection.

8. A computer storage medium having computer-executable instructions for operating a computer connected to a network, the computer having a network protocol that processes information transmitted over the network through a plurality of connections, the computer-executable instructions performing steps comprising:
a) mapping a set of virtual processing units to a set of physically installed processing units;
b) creating a plurality of network communication management structures, each network communication management structure storing information about a connection of the plurality of connections and having at least one field for storing data accessed by any processing unit in the set of physically-installed processing units when processing a network protocol request relating to the connection; and
c) processing a network protocol request from the network protocol, the network protocol request being associated with a connection of the plurality of connections, the processing comprising:
i) accessing virtual processing unit of the set of virtual processing units;
ii) determining a physically installed processing unit of the set of physically installed processing units to which the virtual processing unit is mapped; and
iii) directing the network protocol request to the determined physically installed processing unit, wherein the determined physically installed processing unit accesses a network communication management structure associated with the connection.

9. The computer storage medium of claim 8, wherein the computer-executable instructions for determining the physically installed processing unit comprise computer-executable instructions for referencing a mapping table, the mapping table relating the set of virtual processing units to the set of physically installed processing units.

10. The computer storage medium of claim 9 having further computer-executable instruction for performing steps comprising:
detecting a modification in the set of physically installed processing units; and
updating the mapping table to relate the set of virtual processing units to the modified set of physically installed processing units.

11. The computer storage medium of claim 8, wherein the computer-executable instructions for mapping the set of virtual processing units to the set of physically installed processing units comprises computer-executable instructions for mapping in a round-robin fashion.

12. The computer storage medium of claim 8, wherein the computer-executable instructions for mapping the set of virtual processing units to the set of physically installed processing units comprises computer-executable instructions for mapping in a block fashion.

13. The computer storage medium of claim 8, wherein each of the network communication management structures is associated with one of the virtual processing units from the set of virtual processing units.

14. The computer storage medium of claim 13, wherein each of the network communication management structures comprise a transmission control block.

15. The computer storage medium of claim 13, wherein the network communication management structures comprise timer wheels.

16. The computer storage medium of claim 8 further comprising computer-executable instructions for performing steps comprising selecting a size of the set of virtual processing units based on a user input.

17. The computer storage medium of claim 8 further comprising computer-executable instructions for performing steps comprising selecting a size of the set of virtual processing units based on a detected hardware configuration.

18. A computer storage medium having a mapping table data structure and a plurality of network communication management data structures,
the mapping table data structure comprising at least one field storing data relating a set of virtual processing units to a set of physically installed processing units, wherein the set of virtual processing units is presented to a network protocol, and wherein the network protocol uses each of the virtual processing units to process network protocol requests associated with at least one connection of the plurality of connections, the mapping table being accessed to determine an appropriate physically installed processing unit, of the set of physically installed processing units, to which to route a network protocol request; and each of the plurality of network communication management data structures storing information about a connection of a plurality of connections, and having at least one field for storing data accessed by any processing unit in the set of physically installed processing units when processing a network protocol request relating to the connection.

19. The computer storage medium of claim 18, wherein the mapping table structure is modified to accommodate a change in the set of physically installed processing units.

20. The computer storage medium of claim 18, wherein a size of the mapping table is proportional to a size of the set of virtual processing units.

21. The computer storage medium of claim 18, wherein the mapping structure relates the set of virtual processing units to the set of physically installed processing units in a round-robin fashion.

22. The computer storage medium of claim 18, wherein the mapping structure relates the set of virtual processing units to the set of physically installed processing units in a block fashion.

* * * * *